United States Patent [19]
Osborn et al.

[11] Patent Number: 5,491,903
[45] Date of Patent: Feb. 20, 1996

[54] METHOD AND DEVICE FOR DETERMINING CONNECTOR SIZE AND ASSEMBLING CONDUCTOR AND CONNECTOR

[75] Inventors: William G. Osborn, Stamford, Conn.; Gus B. Smith, Houston, Tex.

[73] Assignee: Burndy Corporation, Norwalk, Conn.

[21] Appl. No.: 376,331

[22] Filed: Jan. 20, 1995

[51] Int. Cl.$^6$ ............................... G01B 3/34; G01B 5/08
[52] U.S. Cl. ............................. 33/555.4; 33/DIG. 7
[58] Field of Search ............................ 33/555.4, 514.1, 33/514.2, DIG. 7

[56] References Cited

U.S. PATENT DOCUMENTS

| | | | |
|---|---|---|---|
| 740,943 | 10/1903 | Summersby et al. | 33/514.2 |
| 2,648,913 | 8/1953 | MacKenzie | 33/555.4 |

FOREIGN PATENT DOCUMENTS

| | | | |
|---|---|---|---|
| 539551 | 7/1959 | Belgium | 33/555.4 |
| 536627 | 5/1922 | France | 33/555.4 |
| 1084470 | 1/1955 | France | 33/555.4 |
| 287263 | 3/1953 | Switzerland | 33/555.4 |

*Primary Examiner*—Alvin Wirthlin
*Attorney, Agent, or Firm*—Burtsell J. Kearns; Patrick J. Walsh

[57] ABSTRACT

A hand held gauge for accurately measuring the circumference of conductors especially conductor cables with multiple strands, for indicating correct connector size for the conductor, and for aiding in the assembly of a bare conductor end into a connector sleeve.

5 Claims, 3 Drawing Sheets

METHOD AND DEVICE FOR DETERMINING CONNECTOR SIZE AND ASSEMBLING CONDUCTOR AND CONNECTOR

BACKGROUND OF THE INVENTION

The present invention relates to a gauge for enabling an electrician or lineman to determine correct connector size for a particular conductor.

Connectors, particularly compression connectors are designed for reliable and repeatable electrical connections, capable of withstanding a wide range of electrical and environmental conditions. Connectors are fabricated of copper for use on copper conductors and aluminum for aluminum conductors with the connectors being designed for attachment to the conductor by means of a circumferential crimp or by an indent crimp.

The desired result in each type crimp is an electrical connection with the conductor cable strands in intimate contact with each other and with the connector barrel with virtually no air pockets and with high pull out strength.

In current practice there is a common problem of determining proper connector size to accommodate the flexible conductors, i.e., a cable of multiple strands commonly used for motor leads. These flexible conductors are extremely difficult to identify by size. After the insulation is stripped away allowing access to the end of the conductor, with appropriate care having been taken not to splay the cable strands, the conductor end is out-of-round as a result of stripping especially in the case of soft conductors, or the conductor is forced out-of-round by use of a measuring caliper. Nonetheless, the only way the installer can be assured of achieving a UL-listed reliable connection is to follow the connector manufacturer's installation instructions calling for the closest fitting connector which can be fitted over the conductor.

Heretofore, the only way to be absolutely sure about connector selection has been to follow this procedure:

1. Measure the diameter of one strand of the conductor to the nearest 1/1000th of an inch using a micrometer caliper.

2. Count the strands.

3. Consult the connector manufacturer's catalog for specific connector recommendation.

This procedure is tedious, time consuming and difficult to perform accurately and seldom used in practice. As a result, connectors are chosen with far less precision and errors are often made. For example, connectors that are too tight cause strand fraying and extra strands are trimmed off. Connectors that are too loose accommodate the conductor easily, however, when installed using the crimping tool recommended by the manufacturer the connector is undercompressed with respect to the conductor resulting in a loose connection prone to overheating and failure and not up to UL standards.

There remains a need for a device that enables installers to achieve quick and accurate matching of connectors and conductors.

SUMMARY OF THE INVENTION

The present invention comprises a hand held gauge for accurately measuring the circumference of conductors especially conductor cables with multiple strands, and for indicating correct connector size for the conductor.

In accordance with the invention, a gauge for correlating conductor circumference and connector size comprises a hand held tool generally resembling a syringe and including an outer barrel and an inner plunger telescoping into the rear end of the barrel. The plunger is spring-loaded to fully extended position with respect to the barrel and is moved into the barrel against spring force. A thin, strong, flexible band in the form of an expanding loop emerges from an opening at the front end of the barrel for encompassing and measuring the stripped end of a conductor. The band is attached to and is manipulated by the plunger through the front end of the barrel to encompass a conductor. A large diameter conductor requires a large loop with the plunger more fully telescoped into the barrel, and a small conductor requires a small loop with less telescoping of the plunger into the barrel. In this way the conductor circumference and the extent of telescoping are correlated and the plunger contains a scale with graduations correlating conductor circumference and connector size.

The gauge is used also as an aid in assembly of the conductor end into the connector sleeve by gathering and containing the connector cable strands into a tight column held by the band loop for insertion into the connector. After insertion is initiated, the band loop is expanded and passed over the connector and removed.

In use, an installer manipulates the gauge by telescoping the plunger into the barrel to produce a band loop large enough to easily fit over the stripped end of the conductor. Next the plunger is released allowing the plunger spring to move the plunger so that the band loop comes to rest in snug engagement with the circumference of the conductor end. A scale on the plunger aligned with the rear end of the barrel indicates correct connector size for the conductor being measured thereby enabling the installer to select the closest fitting connector for the conductor end.

OBJECTS OF THE INVENTION

It is an object of the invention to provide a gauge for enabling an installer to select the appropriate connector for a conductor size in hand.

It is an object of the invention to provide a hand held gauge for field use enabling an installer to measure a conductor circumference with direct readout in connector size or manufacturer's connector catalog number.

It is a further object of the invention to provide a syringe type gauge capable of one-hand manipulation and including an expandable band for gauging the circumference of a conductor together with a scale for correlating conductor circumference and connector size.

It is a further object of the invention to provide a conductor/connector correlating gauge for readily and accurately determining the size of the stripped ends of conductor cables with multiple strands without distorting the integrity or shape of the conductor end.

It is a further object of the invention to provide a conductor/connector correlating gauge having the look, feel, and operation of a syringe that can be used with great ease to accomplish a connector installation list to UL standards and which satisfies the connector manufacturer's recommendations.

It is a further object of the invention to provide a tool useful also as an aid in assembly of the conductor end into the connector sleeve.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
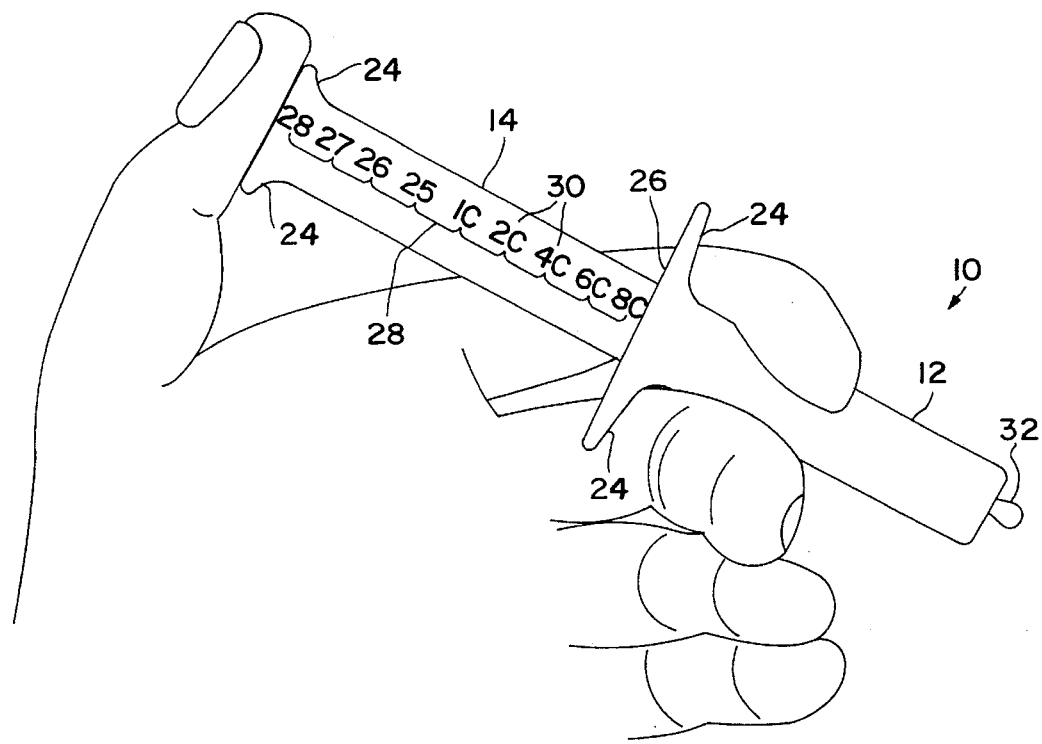
FIG. 1 is a general arrangement view of the gauge of the invention with plunger and barrel in articulated or extended positions with respect to each other.

Referring now to the drawing, the invention comprises a gauge 10 for correlating conductor circumference and connector size. The gauge is a hand held tool generally resembling a syringe including an outer barrel or gauge housing 12 and an inner plunger or slide indicator 14. The barrel and plunger are fabricated of lightweight, dimensionally stable material such as molded plastic suitable for the usual wear and tear and environmental conditions encountered in the trade. The barrel and plunger may be in the form of cylinders or polyhedrons as a matter of design choice.

Figure 2:
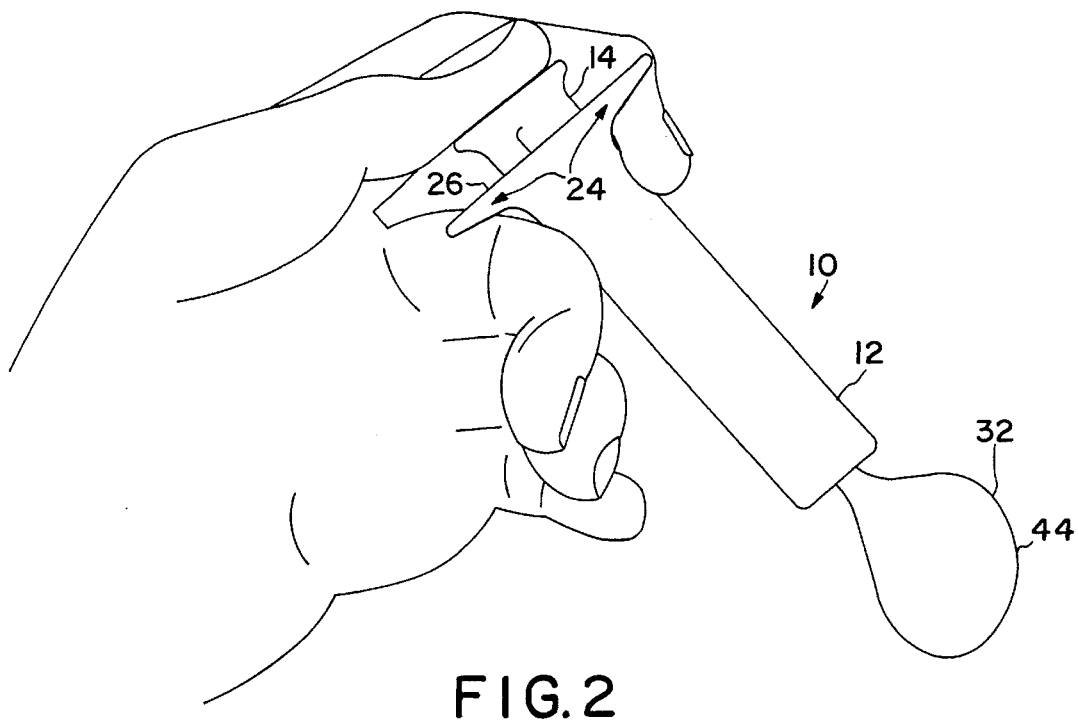
FIG. 2 is a general arrangement view of the gauge of the invention with plunger and barrel in nested or compressed position.
Figure 4:
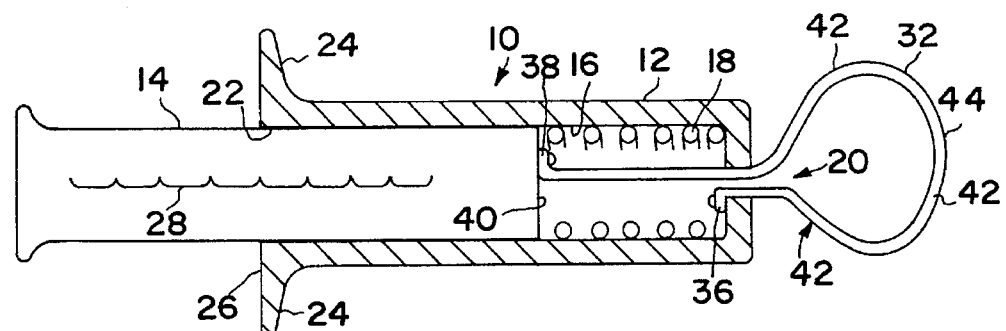
FIG. 4 is a longitudinal section view of the gauge of FIG. 3 showing a preferred arrangement for the internal plunger spring and connections of the band loop.

The barrel includes a unitary body with hollow interior defining a barrel chamber 16 (FIGS. 4–5) for receiving the plunger and a plunger spring 18, openings 20, 22 through front and rear ends of the barrel, and flared shoulders 24 at the rear end for gripping by an install as shown in FIGS. 1 and 2. The rear surface of the plunger defines an indicator edge 26 for reading the connector/conductor correlation scale 28 on the side face of the plunger.

Figure 3:
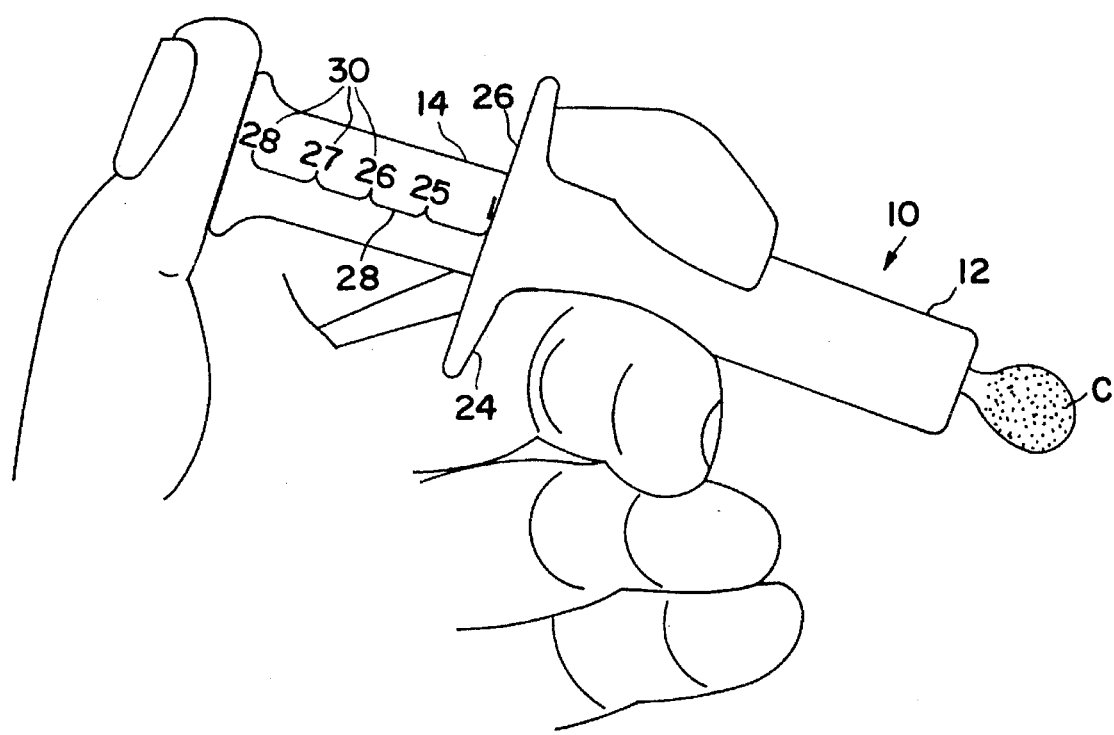
FIG. 3 is a general arrangement view of the gauge of the invention with the band loop encompassing a conductor and the plunger scale indicating a specific connector size for the conductor.

The plunger telescopes into the opening in the rear end of the barrel. The plunger is spring-loaded to a normal fully extended position with respect to the barrel by means of the compression spring 18. The installer moves the plunger into the barrel against spring force. A side face of the plunger is inscribed with a conductor/connector correlation scale with graduations 30 listing a series of connector sizes by size number or manufacturer's catalog number or by any other suitable indicia for readily correlating conductor and connector for a particular installation. As detailed below, the gauge indicates correct connector size for a particular conductor by reading the connector number at the intersection of the scale 28 and indicator edge 26 as shown in FIG. 3.

A thin, strong, flexible band 32 of spring steel for example is manipulated by the plunger to form an expanding loop or closing loop 44 emerging from the opening at the front end of the barrel for encompassing and measuring the stripped end of a conductor C. One end 36 of the band (FIG. 4) is attached to the barrel just inside the opening with the other end 38 affixed to the front face 40 of the plunger. By moving the plunger into the barrel, the band loop passes out through the front end opening of the barrel with the mid portion 42 of the band defining an enlarged loop 44 for encompassing a conductor. A large diameter conductor requires a large loop with the plunger more fully telescoped into the barrel, and a small conductor requires a small loop with less telescoping of the plunger into the barrel. The internal spring resists enlargement of the loop and consequently provides the installer with an excellent degree of feel and control over expansion and contraction of the loop and in gathering within the band loop all the strands of a bare cable end. The plunger spring, by exerting force on the plunger, draws the band into firm engagement with the outer surface of the conductor bare end and thereby provides accurate gauging or measuring of the conductor end. The extent of loop expansion beyond the base loop shown in FIG. 1 determines the relative position of the plunger and the plunger scale with respect to the indicator edge. In this way the plunger scale directly correlates conductor circumference and connector size.

Figure 5:
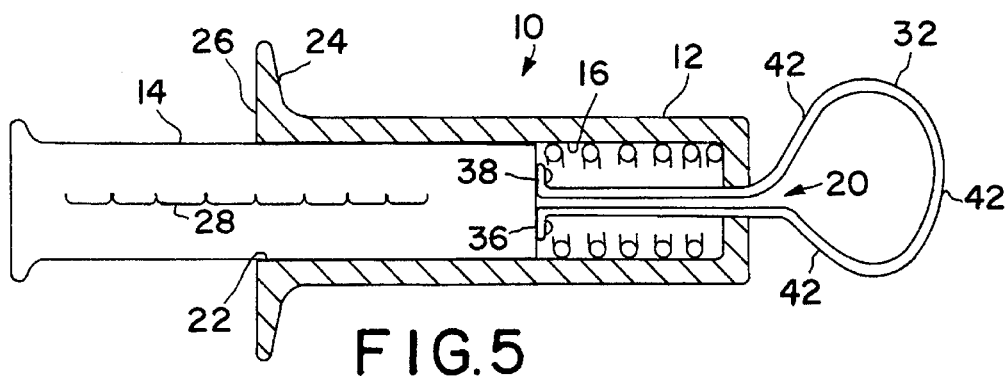
FIG. 5 is a longitudinal section view of the gauge of FIG. 3 showing a modified arrangement for the connections of the band loop.

An alternate arrangement for mounting the measuring band is shown in FIG. 5, wherein both ends 36, 38 of the band are attached to the front face 40 of the plunger. By moving the plunger into the barrel, the band loop passes out through the front end opening 20 of the barrel with the mid portion 42 of the band defining an enlarged loop 44 for encompassing a conductor.

In use, an installer grips the gauge as shown in FIG. 1 and manipulates the gauge by telescoping the plunger into the barrel to produce a band loop large enough to easily fit over the stripped end of the conductor. Next the plunger is released allowing the plunger spring to move the plunger to a position shown in FIG. 3 in which the band loop comes to rest in snug engagement with the circumference of the conductor end. The scale on the plunger aligned with the indicator edge of the barrel indicates correct connector size for the conductor being measured.

The gauge is used also as an aid in assembly of the conductor end into the connector sleeve by gathering and containing the connector cable strands into a tight column held by the band loop for insertion into the connector. After insertion is initiated, the band loop is expanded and passed over the connector and removed.

Figure 6:
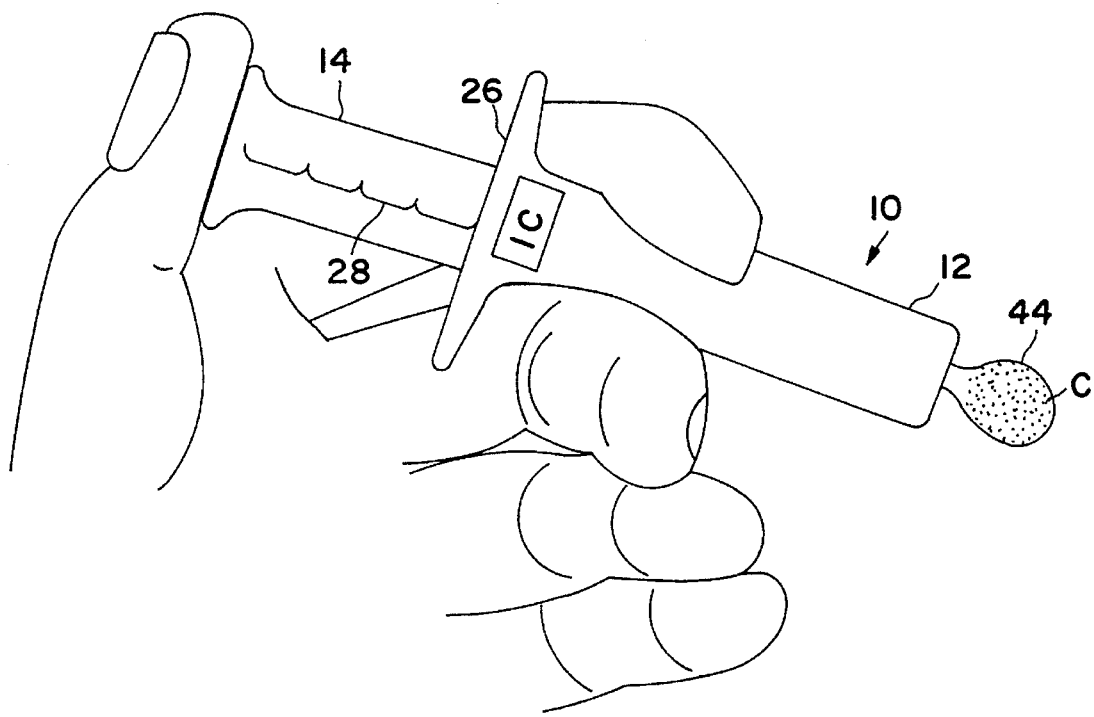
FIG. 6 is a schematic view of a gauge according to the invention fitted with a digital display readout.

It is within the purview of the invention to provide a digital display of the closest fitting connector for a particular conductor end measured by the gauge. For this purpose, a gauge shown in FIG. 6 is provided with a digital display responsive to the relative position of indicator slide and gauge housing as well as band loop circumference for indicating the size of the closest fitting connector for specific conductor circumference.

The gauge makes accurate connector selection easy, assuring that the installer can achieve a UL-listed connection which can be relied on to provide long trouble-free service.

We claim:

1. A device for engaging and holding a conductor cable formed of multiple strands in a tight column and for matching and assembling the conductor with a connector to achieve a reliable connection comprising a barrel having an interior chamber, an open front end and an open rear end, a plunger inserted through the rear open end in telescoping relation with the barrel, means for biasing the plunger toward said open rear end to an articulated position with respect to the barrel, a band attached to the plunger and passing through the front open end of the barrel to define a loop immediately outside the barrel, the plunger being operative to expand and contract the loop for engaging the circumference of the multiple strands of a conductor end, the loop together with said bias means being further adapted for gathering and holding the multiple strands into a tight column for insertion into a connector, and the plunger having indicia directly specifying the particular connector to be used with the conductor held by the band, whereby the tight column of conductor strands held by the loop is inserted into the specified connector.

2. A device as defined in claim 1 in which the band comprises an elongated strip having both ends affixed to the plunger within the interior chamber with the midportion of the band extending through the barrel front open end to define the loop, and with the loop size being determined by the position of the plunger within the barrel chamber.

3. A device as defined in claim 1 in which the band comprises an elongated strip having a first end affixed to the plunger within the interior chamber and a second end affixed to the barrel within the interior chamber, the band having a midportion extending through the barrel front open end to define the loop, and with the loop size being determined by the position of the plunger within the barrel chamber.

4. A gauge according to claim 1 in which the means for correlating the conductor end to a specific connector size is a digital display responsive to the circumference of band loop.

5. A device as defined in claim 1 in which the barrel is provided with flared shoulders at the open rear end thereof to facilitate one-hand operation of the device.

* * * * *